(12) United States Patent
Arsenenau

(10) Patent No.: US 8,720,662 B2
(45) Date of Patent: May 13, 2014

(54) ROLLER WITH MODULAR HUB ASSEMBLY

(75) Inventor: Paul N. Arsenenau, Fort Worth, TX (US)

(73) Assignee: Dynocom Industries, Inc., Fort Worth, TX (US)

( * ) Notice: Subject to any disclaimer, the term of this patent is extended or adjusted under 35 U.S.C. 154(b) by 2 days.

(21) Appl. No.: 13/607,648

(22) Filed: Sep. 7, 2012

(65) Prior Publication Data

US 2014/0069767 A1 Mar. 13, 2014

(51) Int. Cl.
*B65G 13/00* (2006.01)

(52) U.S. Cl.
USPC ............................................................ 193/37

(58) Field of Classification Search
USPC .............................. 193/37; 198/780, 789, 824
See application file for complete search history.

(56) References Cited

U.S. PATENT DOCUMENTS

| | | | | |
|---|---|---|---|---|
| 3,353,644 | A * | 11/1967 | McNash et al. | 193/37 |
| 4,059,180 | A * | 11/1977 | Krivec et al. | 193/37 |
| 7,028,825 | B2 * | 4/2006 | Scott | 193/37 |
| 8,025,145 | B2 * | 9/2011 | Keys | 198/825 |
| 2007/0261933 | A1 * | 11/2007 | Scott | 193/37 |
| 2009/0045029 | A1 * | 2/2009 | Deur | 193/37 |
| 2013/0140131 | A1 * | 6/2013 | Kaminski, Jr. | 193/37 |

* cited by examiner

*Primary Examiner* — Leslie A Nicholson, III
(74) *Attorney, Agent, or Firm* — Mark W Handley

(57) ABSTRACT

A roller assembly (10) is provided having a roller (12) to which two shafts (14, 16) are fixedly secured by means of modular hub assemblies (18). The hub assemblies (18) each have a roller flange (20) which is fixedly secured to the roller (12), usually by welding. A shaft flange (26) is provided for fixedly securing directly to a respective one of the shafts (14, 16), preferably with a pressed fit. The shafts (14, 16) have tapered end sections (64) which fit in direct contact with tapered holes (32) formed into the roller flanges (20). The roller flanges (20 are further recessed to each provide a recessed surface (36) which fits flush against an inward facing surface (48) of the shaft flange (26) to provide a friction engagement there-between. The shaft flange (26) is preferably threadingly secured to the roller flange (20).

20 Claims, 4 Drawing Sheets

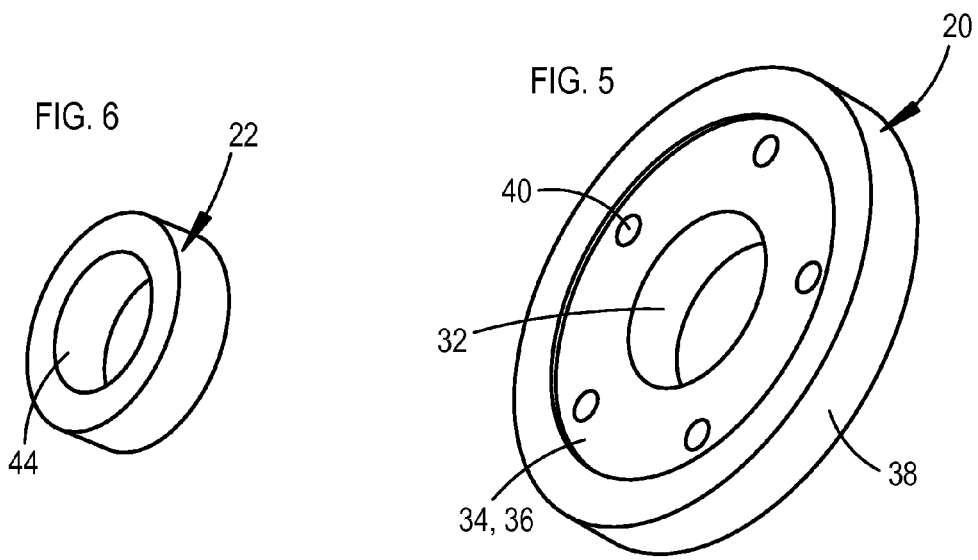
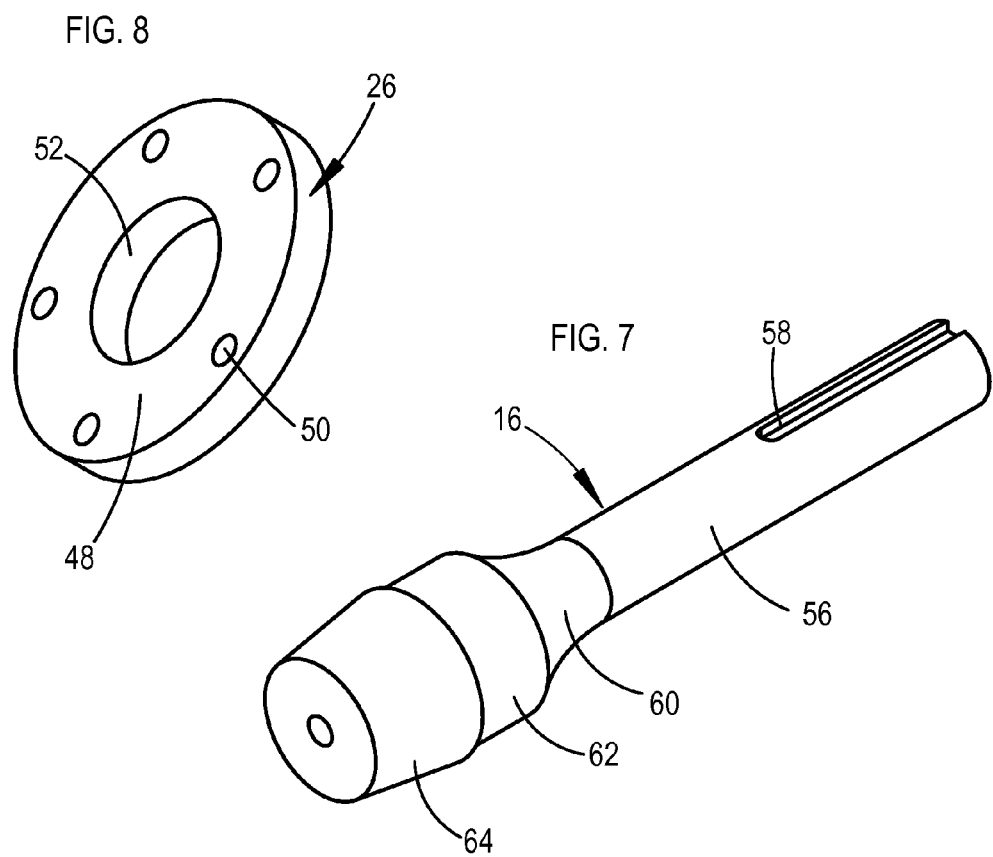

ROLLER WITH MODULAR HUB ASSEMBLY

TECHNICAL FIELD OF THE INVENTION

The present invention relates in general to hub assemblies for rotating structures, and in particular to a roller having a modular hub assembly.

BACKGROUND OF THE INVENTION

Prior art rollers have been provided for use in various applications such as dynamometers and printing presses. Such rollers typically have hubs for fixedly securing shafts in concentric alignment with the rollers. These rollers and shafts are typically non-rotatably secured together in fixed relation. Some rollers and shafts have been welded together, and others are secured in a press to fit arrangement. This often results in destruction of the roller and the hub assembly should a shaft or other component need replacement. Thus, the entire roller assembly is often replaced rather than just the damaged component.

It is often impossible to maintain a low roller to shaft run-out due to how currently available taper lock assemblies operate. For welded shafts, the roller assembly in most cases has to be re-machined due to the pulling effect of the welding process between two metals. Furthermore, the materials have to be compatible for a weld to occur, thus different materials cannot be used for the shaft and the roller.

A full length shaft was usually required when conventional prior art taper lock bushings are used to secure a roller to the shaft. A full length shaft will run the complete length of the roller and outside of opposite ends of the roller for securing to the taper lock bushings. Use of a full length shaft often wastes material than if tapered shafts could be used for the opposite ends of rollers. A full length shaft also provides an assembly with a high degree of shaft deflection based on the diameter of a full length shaft. The materials have to have the same tensile strength for a conventional prior art taper lock bushings to adequately function.

SUMMARY OF THE INVENTION

A roller assembly is provided having a roller in which two shafts are fixedly secured to the roller by means of modular hub assemblies. Each modular hub assembly has a roller flange which is fixedly secured to the roller, usually by welding. Shaft flanges are provided for fixedly securing directly to respective ones of the two shafts, preferably with a press fit. Each of the shafts has a tapered end which fits in direct contact with a tapered hole formed into respective ones of the roller flanges. The roller flanges are have outward faces which are recessed to provide recesses surfaces which fit flush against respective ones of inward facing surfaces of the two shaft flanges to provide a friction engagement there-between. The shaft flanges are preferably threadingly secured to respective ones of the roller flanges, such that the shafts and shaft flanges maybe easily and non-destructively removed from the rollers and the roller flanges. The roller and the modular hub assembly need not be made of similar materials since a tapered alignment and bolt-on flange holds the complete assembly together.

DESCRIPTION OF THE DRAWINGS

For a more complete understanding of the present invention and the advantages thereof, reference is now made to the following description taken in conjunction with the accompanying Drawings in which FIGS. 1 through 8 show various aspects for a roller with modular hub assembly made according to the present invention, as set forth below:

FIG. 1 is a perspective view of a roller having a modular hub assembly;

FIG. 2 is longitudinal section view of the roller having the modular hub assembly, taken along section line 2-2 of FIG. 1;

FIG. 3 is a longitudinal section view of the roller having two roller flanges and flange rings mounted within the roller;

FIG. 4 is an exploded, partial section view of the modular hub assembly for mounting within the roller;

FIG. 5 is a perspective view of a roller flange;

FIG. 6 is a perspective view of a flange ring;

FIG. 7 is a perspective view of a roller shaft; and

FIG. 8 is a perspective view of a shaft flange.

DETAILED DESCRIPTION OF THE INVENTION

Figure 1:
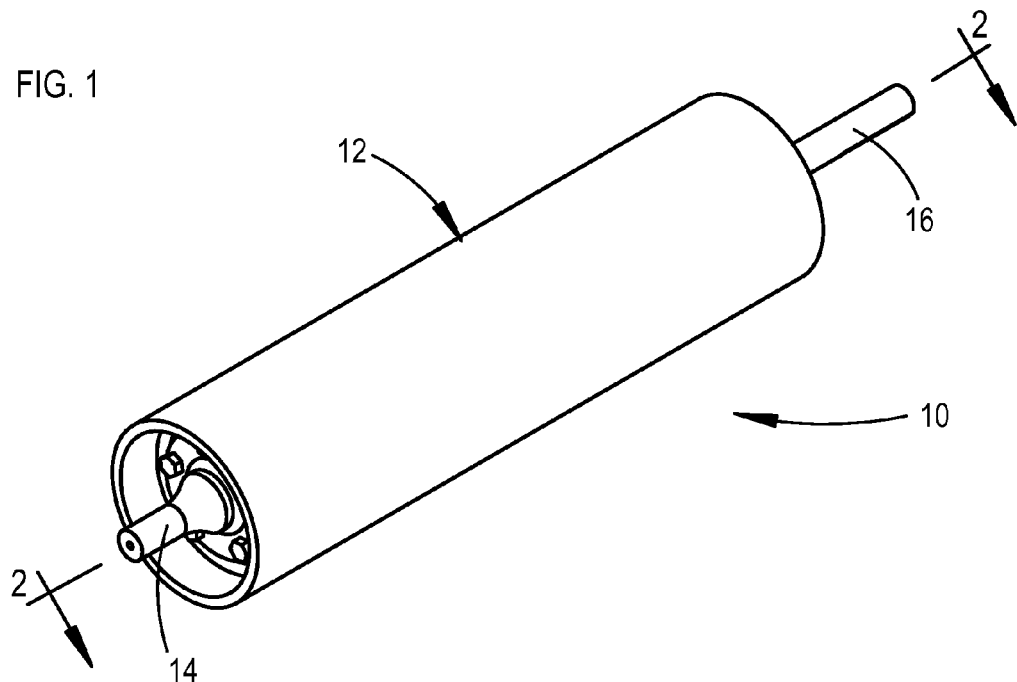
Figure 2:
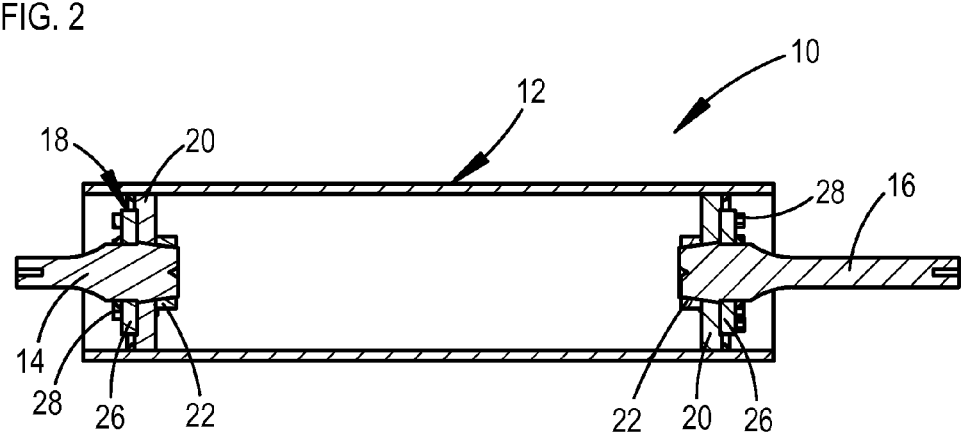

Referring to the Figures, FIG. 1 is a perspective view of a roller assembly 12, and FIG. 2 is longitudinal section view of the roller assembly 12 of FIG. 1, taken along section line 2-2. The roller assembly 10 has a roller 12 with modular hub assemblies 18. A first shaft 14 and a second shaft 16 are fixedly, or non-rotatably secured, to the roller 12 by means of the hub assemblies 18. The hub assembly 18 includes a roller flange 20 and a flange ring 22 which is mounted to the roller flange 20. A shaft flange 26 is fixedly secured, that is a non-rotational relation, to respective ones of the first shaft 14 and the second shaft 16. Fasteners 28 extend through the shaft flange 26 and threadingly secure to the roller flange 20. The roller assembly 10 has a centerline 30 about which the roller 12, the first shaft 14, the second shaft 16 and the hub assembly 18 are co-axially and concentrically disposed.

Figure 3:
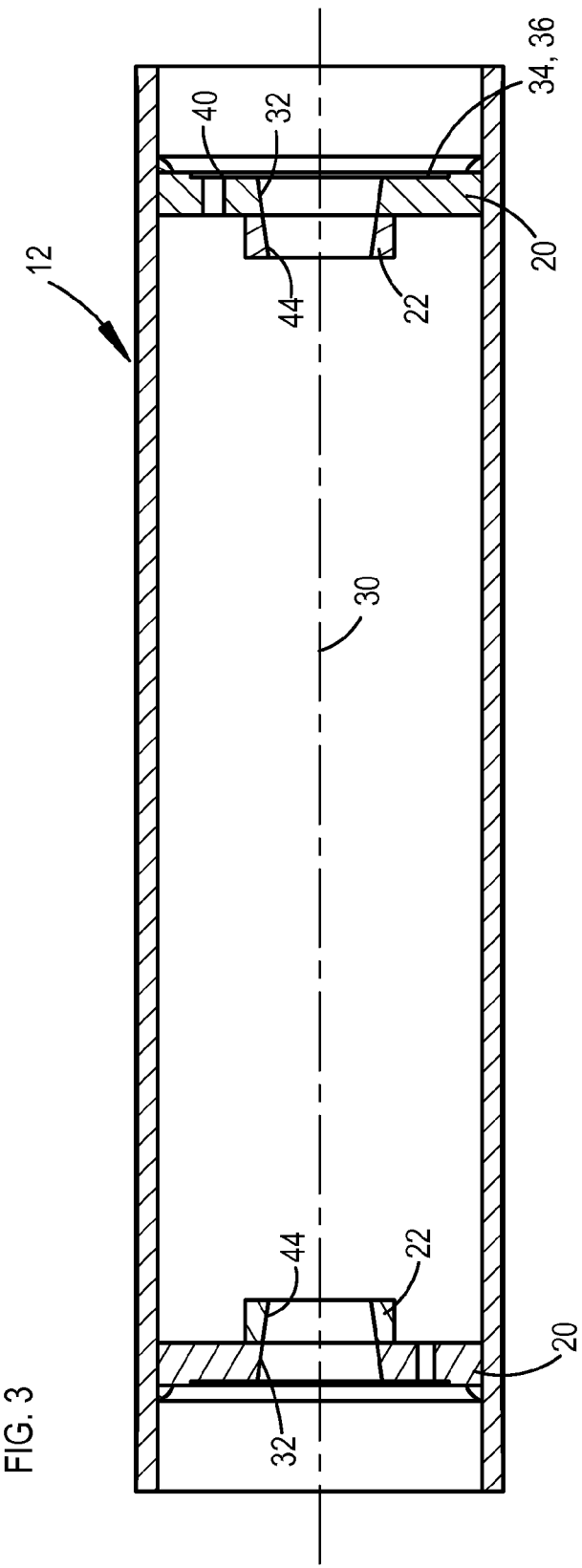
Figure 4:
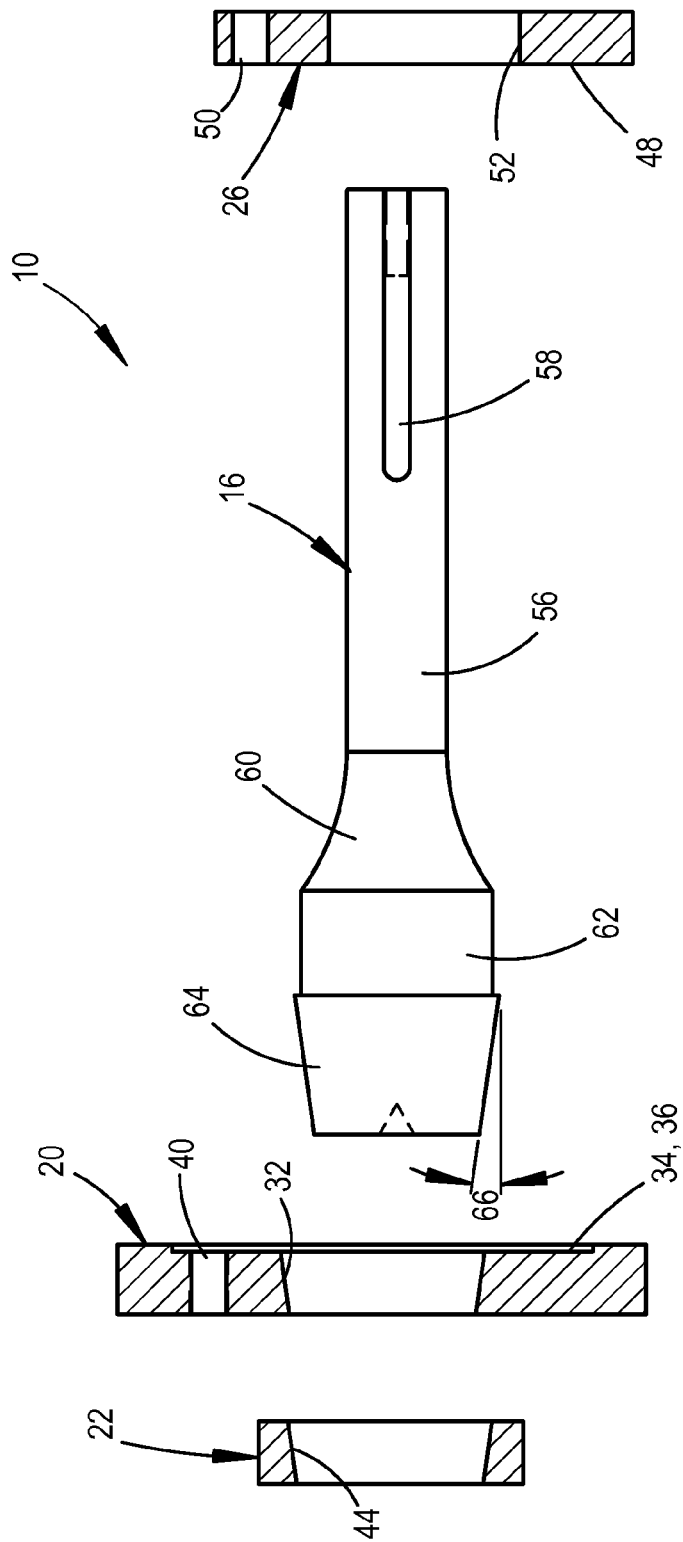

FIG. 3 is a longitudinal section view of the roller 12 to which has been welded the roller flange 20 and the flange ring 22. FIG. 4 is an exploded, partial section view of the hub assembly 18, and FIGS. 5-8 are perspective views of various components of the hub assembly 18. The roller flange 20 has a tapered hole 32 concentrically disposed around the centerline 30. A cylindrical, disk shaped recess 34 is formed into the outer face of the roller flange 20, and defines a recessed surface 26. The outer periphery 38 of the roller flange 20 is preferably formed for fitting flush against and fully around within the interior of the roller 12. The roller flange 20 is preferably welded to the roller 12. Fasteners holes 40 are preferably provided spaced angularly apart around the centerline 30 and are threaded for receiving the fasteners 28.

The flange ring 22 preferably has a cylindrically shaped body with a tapered hole 44 extending there-through. The outward end of the tapered hole 44 of the flange ring 22 is preferably sized to fit flush with the inward end of the tapered hole 32 of the roller flange 20. The flange ring 22 is optional, and when used is provided for extending the length of the tapered hole 32 through the roller flange 20 for non-rotatably securing the shafts 14 and 16 to respective ones of the roller flanges 20. The flange ring 22 will fit on the inside of a respective one of the two roller flanges 20, and preferably is welded thereto. In the preferred embodiment the roller 12, the roller flange 20 and the flange ring 22 may be formed of composite materials such as plastic based composite materials. In other embodiments, metal may be used for forming the roller 12, the roller flange 20 and the flange ring 22.

The shaft flange 26 is preferably a shallow cylindrical shape which is disk-like in appearance and has a mounting hole 52 extending there-through such that the shaft flange 26 also resembles a ring, or is annular shaped. An inward end of the shaft flange 26 has a face 48 which is sized for fitting flush against the recess surface 36 of the roller flange 20 such that when the fasteners 28 are fully secured to the shaft flange 26 and the roller flange 20, the recessed surface 36 and the face 48 will press flush together and provide a frictional engagement for non-rotatingly securing the flange 26 to the flange 20. Fastener holes 50 are angularly spaced apart around the centerline 30 to extend through the shaft flange 26 for aligning with the fastener holes 40 formed into the roller flange 20. The fastener holes 50 are thru-holes extending fully through the body of the shaft flange 26. The mounting hole 52 is concentrically disposed about the centerline axis 30 and is sized for providing a pressed fit with a respective one of the shafts 14 and 16. Preferably a pressed fit is obtained using electric induction heating and then air cooling.

The first shaft 14 and the second shaft 16 each have a shank 56 with a key slot 58 formed in an outward end. A tapered neck portion 60 extends from the shank 56 to an enlarged cylindrically shaped, mounting section 62, which is adjacent to a tapered section 64 located at the inward terminal ends of respective ones of the shafts 14 and 16. The cylindrically shaped, mounting section 62 is preferably sized for engaging in the shrink fit with the mounting hole 52 formed through the shaft flange 56. The end portions 64 of the shafts 14 and 16 are tapered to extending to a smaller diameter in an inward direction, preferably at an angle 66 of eight degrees (8°) from being parallel to the centerline 30.

Similarly, the tapered holes 32 and 44 and respective ones of the roller flange 20 and the flange ring 22 are also tapered at a eight degrees (8°) angle 66 from being parallel to the centerline axis 30. This provides a self-centering alignment between the shafts 14 and 16, the shaft flanges 26, the roller flanges 20, the flange ring 24, and the roller 12.

The present invention provides a self-centering, modular hub assembly for fixedly, or non-rotatably, securing a rotary support shaft to a roller. The modular features provides that the shafts may be removed an other shafts installed for a roller without destruction of the roller. The allows bearing and/or shaft replacement in the field without requiring the replacement of the entire roller assembly. Since the roller and the shaft need not be made of similar materials, hybrid materials may be used for the roller, the roller flange and the flange ring, such as composite materials formed of thermoplastic materials. Aluminum and steel may also be used for various parts. When a shaft is replaced or a roller is changed, re-balancing of the roller and shaft assembly is not required since the individual components may be pre-balanced. Additionally, the precision machining of the individual components before they are bolted together ensures a precision fit, centering the shaft to the roller to provide less run-out, or concentricity of shaft and roller centerlines, for smoother operation and less vibration. Field conversions from different shaft and bearing sizes can more easily be done without replacing the entire assembly, such as when a conversion from use of English to metric bearings is required. The total shaft and roller deflection is greatly reduced due to the large shaft to flange engagement, while high bearing speeds are maintained due to the tapered shaft design.

Although the preferred embodiment has been described in detail, it should be understood that various changes, substitutions and alterations can be made therein without departing from the spirit and scope of the invention as defined by the appended claims.

What is claimed is:

1. A roller assembly comprising:
    a roller having an outer cylindrical surface and defining a longitudinal axis about which said outer cylindrical surface is concentrically disposed;
    a roller flange having an outer periphery which is secured in fixed relation to said roller, said roller flange having a tapered hole concentrically disposed about said longitudinal axis, and a plurality of fastener holes disposed in said roller flange;
    a shaft having a shank, a mounting section and a tapered section, with said shank disposed outward of said mounting section and said tapered section disposed inward of said mounting section, said tapered section tapering to a smaller size toward an inward terminal end of said shaft;
    a shaft flange having a mounting hole for fixedly securing said mounting section of said shank therein, and said shaft flange further having apertures in alignment with respective ones of said plurality of fastener holes in said roller flange for receiving fasteners there-between;
    wherein said shaft flange is secured to said roller flange with said tapered section of said shaft engaging within said tapered hole in said roller flange to concentrically align said shaft with said roller.

2. The roller assembly according to claim 1, further comprising said mounting section of said shaft being fixedly secured within said mounting hole of said shank flange by means of a press fit there-between.

3. The roller assembly according to claim 1, further comprising:
    said roller flange having an outward side with a recessed formed therein to define a recessed surface; and
    said shaft flange having a inwardly disposed face for engaging said recessed surface of said roller flange.

4. The roller assembly according to claim 1, further comprising a flange ring fixedly secured to said roller flange, said flange ring having a second tapered hole which is registered with said tapered hole of said roller flange and has an outward portion which is aligned flush with an outward portion of said tapered hole of said roller flange for receiving an end portion of said tapered section of said shaft.

5. The roller assembly according to claim 1, wherein said roller and said roller flange are formed of composite materials.

6. The roller assembly according to claim 5, wherein said composite materials are formed, at least in part, of thermoplastic.

7. The roller assembly according to claim 6, wherein said roller flange is permanently joined to said roller.

8. The roller assembly according to claim 1, wherein said tapered hole in said roller flange and said tapered section of said shaft have tapered surfaces disposed at approximately an eight degree angle from being parallel to a centerline and axis of rotation of said roller.

9. A roller assembly comprising:
    a roller having an outer cylindrical surface and defining a longitudinal axis about which said outer cylindrical surface is concentrically disposed;
    a roller flange having an outer periphery which is secured in fixed relation to said roller, said roller flange having a tapered hole concentrically disposed about said longitudinal axis, a plurality of fastener holes disposed in said roller flange, and an outward side with a recessed formed therein to define a recessed surface;
    a shaft having a shank, a mounting section and a tapered section, with said shank disposed outward of said mounting section and said tapered section disposed inward of said mounting section, said tapered section tapering to a smaller size toward an inward terminal end of said shaft;

a shaft flange having a mounting hole configured for fixedly securing said mounting section of said shank therein, and said shaft flange further having apertures in registration with respective ones of said plurality of fastener holes in said roller flange for receiving fasteners there-between, and an inwardly disposed face for engaging said recessed surface of said roller flange; and wherein said shaft flange is secured to said roller flange with said tapered section of said shaft engaging within said tapered hole in said roller flange to concentrically align said shaft with said roller, such that said shaft is self-centering in relation to said roller flange and said roller.

10. The roller assembly according to claim 9, further comprising said mounting section of said shaft being fixedly secured within said mounting hole of said shank flange by means of a press fit there-between.

11. The roller assembly according to claim 9, further comprising a flange ring fixedly secured to said roller flange, said flange ring having a second tapered hole which is registered with said tapered hole of said roller flange and has an outward portion which is aligned flush with an outward portion of said tapered hole of said roller flange for receiving an end portion of said tapered section of said shaft.

12. The roller assembly according to claim 11, wherein said roller and said roller flange are formed of composite materials.

13. The roller assembly according to claim 12, wherein said composite materials are formed, at least in part, of thermoplastic.

14. The roller assembly according to claim 9, wherein said tapered hole in said roller flange and said tapered section of said shaft have tapered surfaces disposed at approximately an eight degree angle from being parallel to a centerline and axis of rotation of said roller.

15. A roller assembly comprising:
a roller having an outer cylindrical surface and defining a longitudinal axis about which said outer cylindrical surface is concentrically disposed;
two roller flanges each having an outer periphery which is secured in fixed relation to said roller, each of said roller flanges having a tapered hole concentrically disposed about said longitudinal axis, and a plurality of fastener holes disposed in each of said roller flange and angularly spaced apart about said longitudinal axis;
two shafts, each shaft having a shank, a mounting section and a tapered section, with said shanks disposed outward of respective ones of said mounting sections and said tapered sections disposed inward of respective ones of said mounting sections, said tapered sections each tapering to a smaller size toward an inward terminal end of a respective one of said shafts;
two shaft flanges, each having a mounting hole for fixedly securing said mounting section of a respective one of said shanks therein, and said shaft flanges further having apertures in registration with respective ones of said plurality of fastener holes in respective ones of said roller flanges for receiving fasteners there-between;

wherein said shaft flanges are each secured to a respective one of said roller flanges with said tapered sections of said shafts engaging within respective ones of said tapered holes in said roller flanges to concentrically align said shafts with said rollers, such that said shafts are self-aligning with respective ones of said rollers.

16. The roller assembly according to claim 15, further comprising said mounting sections of said shafts being fixedly secured within said mounting holes of said shank flanges by means of press fits there-between.

17. The roller assembly according to claim 15, further comprising:
said roller flanges having an outward sides with recesses formed therein to define a recessed surfaces; and
said shaft flanges having inwardly disposed faces for engaging respective ones of said recessed surfaces of said roller flanges.

18. The roller assembly according to claim 15, further comprising flange rings fixedly secured to respective ones said roller flanges, said flange rings each having a second tapered hole which is registered with respective ones of said tapered holes of said roller flanges and has an outward portion which is aligned flush with an outward portion of the respective ones of said tapered holes of said roller flanges for receiving end portions of said tapered sections of said shafts.

19. The roller assembly according to claim 15, wherein said roller and said roller flanges are formed of composite materials.

20. The roller assembly according to claim 15, wherein said tapered hole in said roller flange and said tapered section of said shaft have tapered surfaces disposed at approximately an eight degree angle from being parallel to a centerline and axis of rotation of said roller.

* * * * *